US012643667B2

(12) United States Patent
Merritt et al.

(10) Patent No.: US 12,643,667 B2
(45) Date of Patent: Jun. 2, 2026

(54) CABIN AIR COMPRESSOR BYPASS FOR SURGE AVOIDANCE

(71) Applicant: Hamilton Sundstrand Corporation, Charlotte, NC (US)

(72) Inventors: Brent J. Merritt, Southwick, MA (US); Viktor Kilchyk, Lancaster, NY (US); Mark G. Vignali, Simsbury, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 477 days.

(21) Appl. No.: 18/305,571

(22) Filed: Apr. 24, 2023

(65) Prior Publication Data

US 2024/0351692 A1      Oct. 24, 2024

(51) Int. Cl.
B64D 13/06          (2006.01)
B64D 13/02          (2006.01)

(52) U.S. Cl.
CPC ............. B64D 13/06 (2013.01); B64D 13/02 (2013.01); *B64D 2013/0618* (2013.01)

(58) Field of Classification Search
CPC ....................... B64D 2013/0618; B64D 13/06; B64D 13/02; B64D 2013/0603
See application file for complete search history.

(56) References Cited

U.S. PATENT DOCUMENTS

| | | | |
|---|---|---|---|
| 10,807,722 B2 | 10/2020 | Himmelmann | |
| 2007/0113579 A1* | 5/2007 | Claeys | B64D 13/02 62/401 |
| 2018/0215473 A1* | 8/2018 | Army | B64D 13/04 |
| 2019/0291875 A1 | 9/2019 | Behrens et al. | |
| 2020/0070986 A1 | 3/2020 | Zug | |
| 2020/0391870 A1 | 12/2020 | Bruno et al. | |
| 2022/0242580 A1* | 8/2022 | Coutin | B64D 13/06 |
| 2022/0348334 A1 | 11/2022 | Ho et al. | |
| 2023/0105630 A1 | 4/2023 | Bruno et al. | |

FOREIGN PATENT DOCUMENTS

EP          3945023 A1      2/2022

OTHER PUBLICATIONS

Extended European Search Report for EP Application No. 24171791. 7, dated Sep. 27, 2024, pp. 1-8.

* cited by examiner

*Primary Examiner* — Ko-Wei Lin
(74) *Attorney, Agent, or Firm* — CANTOR COLBURN LLP

(57)          ABSTRACT
An environmental control system for a vehicle includes at least one cabin air compressing device including a compressor having a compressor inlet and a compressor outlet. The environmental control system additionally includes an environmental control system pack located downstream from and fluidly coupled to the compressor outlet via at least one conduit. The environmental control system pack includes a ram air circuit. A bypass conduit fluidly couples the compressor outlet to the ram air circuit.

19 Claims, 2 Drawing Sheets

20

CABIN AIR COMPRESSOR BYPASS FOR SURGE AVOIDANCE

BACKGROUND

Exemplary embodiments pertain to the art of thermal management and, in particular, to thermal management of one or more loads of a vehicle.

Environmental control systems (ECS) are utilized on various types of aircraft for several purposes, such as air supply systems and/or cabin condition systems for the aircraft. For example, components of the environmental control system may be utilized to remove heat from various aircraft lubrication and electrical systems and/or used to condition aircraft cabin air. A cabin air conditioning may include one or more cabin air compressing devices (CAC) which compress air entering the system from an outside source or from a ram air system. The compressed air is typically delivered to an environmental control system pack to bring it to a desired temperature then delivered to the aircraft cabin. After passing through the cabin, the air is typically exhausted to the outside. The CACs may be driven, for example, by air-cooled electric motors.

In an environmental control system utilizing two CACs, it is desirable to operate both CACs at relatively identical flow levels, known as operating at nearly identical operating points on a compressor map, or symmetrical operation. Failure to do so may result in various inefficient or undesirable operational characteristics, such as compressor surging, that can lead to unstable airflow. In an effort to monitor the operating points of the CACs, various sensors are employed. Inherent errors associated with the sensors may lead to uncertainty of operating points. Various other reasons lead to asymmetric operation, thereby causing inefficient and/or undesirable operation of the CACs.

BRIEF DESCRIPTION

According to an embodiment, an environmental control system for a vehicle includes at least one cabin air compressing device including a compressor having a compressor inlet and a compressor outlet. The environmental control system additionally includes an environmental control system pack located downstream from and fluidly coupled to the compressor outlet via at least one conduit. The environmental control system pack includes a ram air circuit. A bypass conduit fluidly couples the compressor outlet to the ram air circuit.

In addition to one or more of the features described herein, or as an alternative, in further embodiments the ram air circuit includes a ram air shell and the bypass conduit being fluidly coupled to an interior of the ram air shell.

In addition to one or more of the features described herein, or as an alternative, in further embodiments the ram air circuit includes at least one ram air heat exchanger arranged within the ram air shell. The bypass conduit is fluidly coupled to the interior of the ram air shell at a location downstream from the at least one ram air heat exchanger.

In addition to one or more of the features described herein, or as an alternative, in further embodiments the at least one ram air heat exchanger includes a plurality of ram air heat exchanger. The bypass conduit is fluidly coupled to the interior of the ram air shell downstream from the plurality of ram air heat exchangers.

In addition to one or more of the features described herein, or as an alternative, in further embodiments a conduit fluidly connects the compressor outlet to the environmental control system pack and the bypass conduit is fluidly connected to the compressor outlet at a location upstream from the conduit.

In addition to one or more of the features described herein, or as an alternative, in further embodiments the cabin air compressing device includes a shaft connected to the compressor and an electric motor operably connected to the shaft and configured to drive the compressor.

In addition to one or more of the features described herein, or as an alternative, in further embodiments the at least one cabin air compressing device includes a first cabin air compressing device and a second cabin air compressing device arranged in parallel.

In addition to one or more of the features described herein, or as an alternative, in further embodiments the bypass conduit is fluidly coupled to the compressor outlet of both the first cabin air compressing device and the second cabin air compressing device.

In addition to one or more of the features described herein, or as an alternative, in further embodiments a valve is associated with the bypass conduit. The valve is operable to control a supply of a compressed first medium provided to the ram air circuit.

In addition to one or more of the features described herein, or as an alternative, in further embodiments a controller is operable to move the valve between a plurality of positions to control the supply of the compressed first medium provided to the ram air circuit.

In addition to one or more of the features described herein, or as an alternative, in further embodiments the compressed first medium includes ram air.

In addition to one or more of the features described herein, or as an alternative, in further embodiments the compressed first medium includes bleed air.

In addition to one or more of the features described herein, or as an alternative, in further embodiments the vehicle is an aircraft.

According to an embodiment, a method of operating an environmental control system of a vehicle includes providing a medium to a compressor inlet of a compressor of at least one cabin air compressing device via a conduit, compressing the medium at the compressor to produce a compressed medium, providing a first portion of the compressed medium from a compressor outlet to an environmental control system pack, and exhausting a second portion of the compressed medium provided at the compressor outlet to a ram air circuit of the environmental control system pack.

In addition to one or more of the features described herein, or as an alternative, in further embodiments exhausting the second portion of the compressed medium provided at the compressor outlet to the ram air circuit includes operating a valve associated with a bypass conduit. The bypass conduit fluidly connects the compressor outlet and the ram air circuit.

In addition to one or more of the features described herein, or as an alternative, in further embodiments the second portion of the compressed medium exceeds a required flow rate of the at least one cabin air compressing device.

In addition to one or more of the features described herein, or as an alternative, in further embodiments the ram air circuit includes a ram air shell having at least one ram air heat exchanger arranged therein. Exhausting the second portion of the compressed medium provided at the compressor outlet to the ram air circuit includes providing the second portion of the compressed medium to the ram air shell downstream from the at least one ram air heat exchanger.

In addition to one or more of the features described herein, or as an alternative, in further embodiments the at least one ram air heat exchanger includes a plurality of ram air heat exchangers and the second portion of the compressed medium is exhausted into the ram air shell downstream from the plurality of ram air heat exchangers.

In addition to one or more of the features described herein, or as an alternative, in further embodiments the vehicle is an aircraft.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
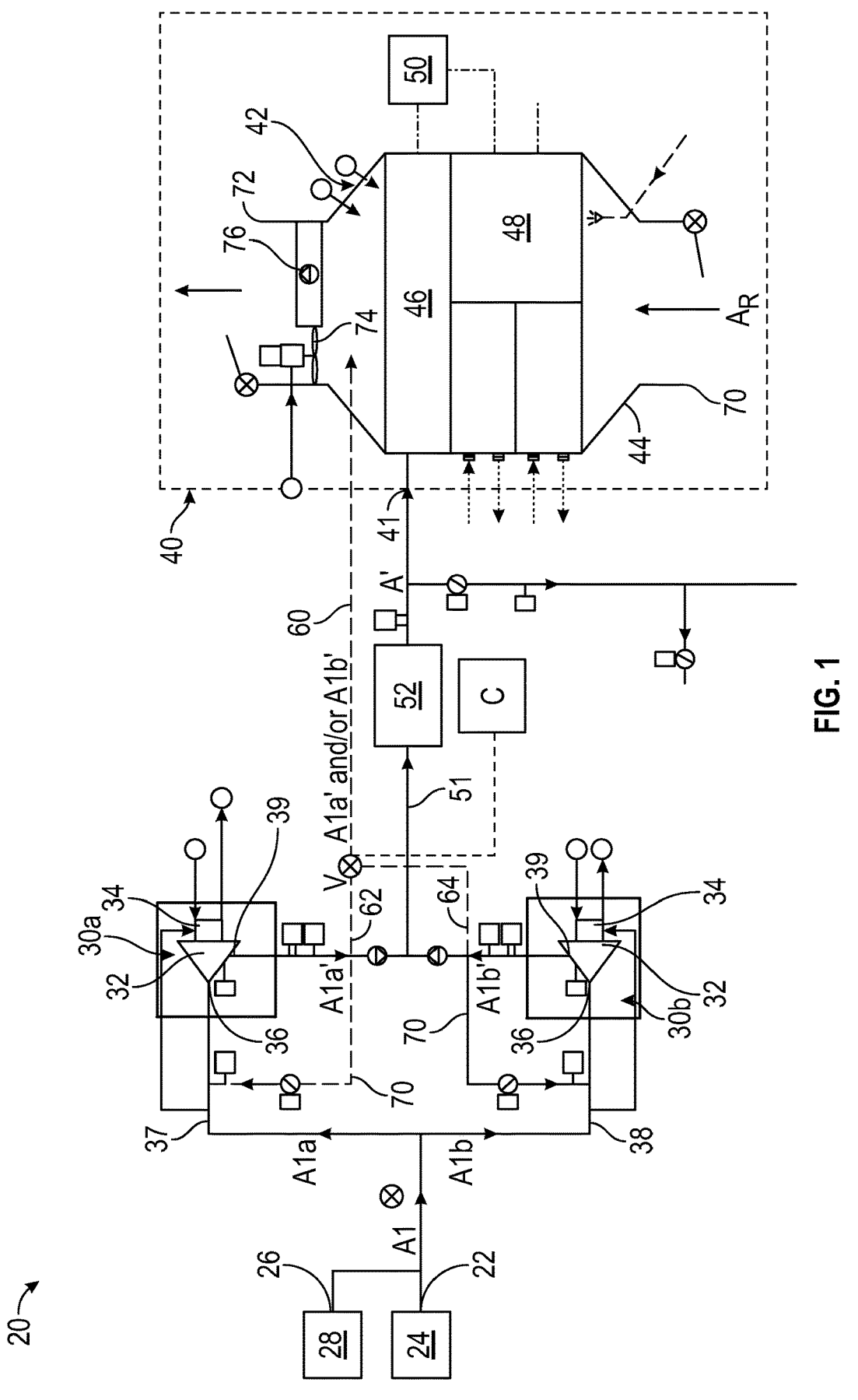
FIG. 1 is a schematic diagram of a portion of an environmental control system of a vehicle according to an embodiment.
Figure 2:
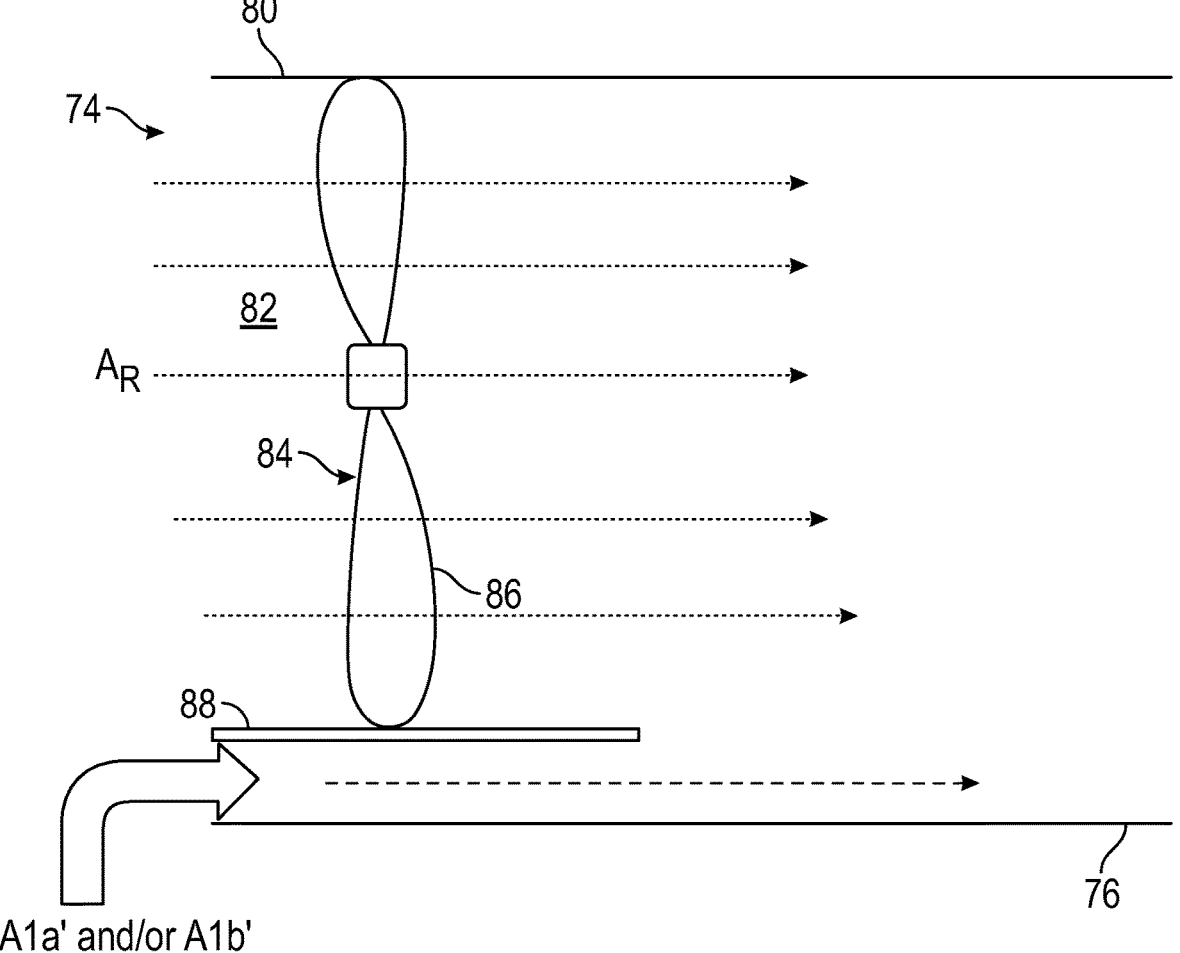
FIG. 2 is a cross-sectional view of a ram air fan of a ram air circuit of an environmental control system pack according to an embodiment.

With reference now to FIG. 1, a schematic diagram of a portion of an environmental control system (ECS) 20 is illustrated. The environmental control system 20 may be a refrigeration or air cycle subsystem and is configured to receive a first medium A at an inlet 22 from a first source 24 and/or at an inlet 26 from a second source 28. In the illustrated, non-limiting embodiment, the first source 24 is an engine or auxiliary power unit of the aircraft and the medium A is bleed air. Alternatively, or in addition, the first medium A provided to the inlet 26 may be fresh air, such as outside air for example. This outside air, also referred to herein as RAM air, can be procured via one or more scooping mechanisms, such as an impact scoop or a flush scoop for example. In such embodiments, the first medium A from the inlet 26 is generally at an ambient pressure equal to an air pressure outside of the aircraft when the aircraft is on the ground and is between an ambient pressure and a cabin pressure when the aircraft is in flight. It should be understood that any suitable first medium A is within the scope of the disclosure. For example, other suitable mediums available on an aircraft include, but are not limited to, cabin discharge air, which is air leaving the cabin and that would typically be discharged overboard.

It should be understood that the elements of the environmental control system 20 are connected via valves, tubes, pipes, and the like. Valves (e.g., flow regulation device or mass flow valve) are devices that regulate, direct, and/or control a flow of a medium by opening, closing, or partially obstructing various passageways within the tubes, pipes, etc. of the system. Valves can be operated by actuators, such that flow rates of the medium in any portion of the environmental control system 20 can be regulated to a desired value.

The environmental control system 20 includes at least one cabin air compressing device. In the illustrated, non-limiting embodiments, the at least one cabin air compressing device includes a first cabin air compressing device 30a and a second cabin air compressing device 30b arranged in parallel. However, embodiments having only a single cabin air compressing device or more than two cabin air compressing devices are also within the scope of the disclosure. Each cabin air compressing device 30a, 30b is a mechanical device that includes one or more components for performing thermodynamic work on a medium (e.g., performs work on the medium by raising and/or lowering the pressure thereof and by raising and/or lowering the temperature thereof.)

Each cabin air compressing device 30a, 30b includes a compressor 32. A compressor 32 is a mechanical device configured to raise a pressure of a medium and can be driven by another mechanical device (e.g., a motor or a medium via a turbine). Examples of compressor types include centrifugal, diagonal or mixed-flow, axial-flow, reciprocating, ionic liquid piston, rotary screw, rotary vane, scroll, diaphragm, air bubble, etc.

In the illustrated, non-limiting embodiment, the cabin air compressing device 30a, 30b additionally includes an electric motor 34, such as mounted to the shaft (not shown) of the compressor 32 to impart rotational motion thereto. The motor 34 can receive power from a power source (not shown) such as generator or a power bus (e.g., a power bus of an aircraft). It should be understood that in other embodiments, the cabin air compressing device 30a, 30b may include additional components, such as a turbine for example. In embodiments including both a turbine and a motor 34 operably coupled to the compressor 32, either or all of the turbine and the motor 34 may be used to drive the compressor 32.

During operation, the first medium A is provided to the environmental control system 20 from one or both of the inlet 22 and the inlet 26. In embodiments where the first medium A is provided from both sources, the two flows merge or mix at a location upstream from the junction where the flow splits into a first flow of first medium A1a provided to the inlet 36 of the first cabin air compressing device 30a via a first pressure conduit 37 and a second flow of first medium A1b provided to the inlet 36 of the second cabin air compressing device 30b via a second conduit 38. The act of compressing the medium A1a or A1b, heats the flow of medium A1a or A1b and increases the pressure of the thereof. Accordingly, at least one of a temperature and pressure of the compressed medium A1a' and A1b' provided at an outlet 39 of each compressor is greater than that of the medium A1a and A1b provided to the compressor inlet 36 of each respective compressor 32.

The first flow of compressed first medium A1a' and/or the second flow of compressed first medium A1b' output from at least one of the cabin air compressing devices 30a, 30b may then be provided to a downstream component or system 40 before it is delivered to a volume of the vehicle, such as a cabin for example. In an embodiment, the first flow of compressed first medium A1a' and the second flow of compressed first medium A1b' are combined upstream from the downstream component or system 40. In such embodiments, the combined flow may simply be referred to as the compressed first medium.

In an embodiment, the first flow of compressed first medium A1a' and/or the second flow of compressed first medium A1b' output from at least one of the cabin air compressing devices 30a, 30b is provided to an ozone converter 52 located upstream from the downstream system or component 40. The ozone converter 52 is configured to convert ozone within the first and/or second flow of compressed first medium A1a', A1b' into oxygen. The resulting reduced-ozone first and/or second flow of compressed first medium A1$a'$, A1$b'$ may then be provided to the downstream system 40 for further conditioning.

In the illustrated, non-limiting embodiment, the downstream system 40 is an environmental control system (ECS) pack 40 and at least one of the first flow of compressed first medium A1$a'$ and the second flow of compressed first medium A1$b'$ is provided to an inlet 41 thereof. The ECS pack 40 operable to condition the at least one of the first flow of compressed first medium A1$a'$ and the second flow of compressed first medium A1$b'$. As shown the ECS pack 40 may include a RAM air circuit 42 including a shell or duct, illustrated schematically at 44, within which one or more heat exchangers are located. The shell 44 can receive and direct a medium, such as ram air A$_R$ for example, through a portion of the ECS pack 40. The one or more heat exchangers are devices built for efficient heat transfer from one medium to another. Examples of the type of heat exchangers that may be used, include, but are not limited to, double pipe, shell and tube, plate, plate and shell, adiabatic shell, plate fin, pillow plate, and fluid heat exchangers.

Each of the one or more heat exchangers arranged within the shell 44 may be referred to as a ram air heat exchanger. In the illustrated, non-limiting embodiment, the at least one ram air heat exchanger includes a first or primary heat exchanger 46 and a second or secondary heat exchanger 48. However, it should be appreciated that embodiments including additional heat exchangers are also within the scope of the disclosure. Within the heat exchangers 46, 48 ram air AR, such as outside air, acts as a heat sink to cool a medium passing there through, for example at least one of the first flow of compressed first medium A1$a'$ and the second flow of compressed first medium A1$b'$ output from one or both of the cabin air compressing devices 30$a$, 30$b$.

The ECS pack 40 additionally comprises at least one thermodynamic device, illustrated schematically at 50. In the illustrated, non-limiting embodiment, the thermodynamic device 50 of the system 20 is a mechanical device that includes components for performing thermodynamic work on a medium (e.g., extracts work from or applies work to the first flow of compressed first medium A1$a'$ and/or the second flow of compressed first medium A1$b'$ by raising and/or lowering pressure and by raising and/or lowering temperature). Examples of the thermodynamic device 50 include an air cycle machine, a three-wheel air cycle machine, a four-wheel air cycle machine, etc.

Although not shown, the thermodynamic device 50 typically includes at least one compressor and at least one turbine coupled to each other via a shaft 56. As previously noted, the compressor is a mechanical device that raises a pressure of a medium and can be driven by another mechanical device (e.g., a motor or a medium via a turbine). The one or more turbines are mechanical devices that are operable to expand a medium and extract work therefrom (also referred to as extracting energy). In the thermodynamic device 50, energy extract within the at least one turbine may be used to drive the compressor via the shaft.

The first and second cabin air compressing devices 30$a$, 30$b$, are typically operated in unison with identical speed control. Accordingly, the flow rate of the first and second flows A1, A2 provided to the cabin air compressing devices 30$a$, 30$b$ may be selectively increased to prevent the occurrence of a surge event at either of the cabin air compressing devices 30$a$, 30$b$. However, such an increase in the flow rate at both cabin air compressing devices 30$a$, 30$b$ may result in excess flow exceeding the required flow rate of one or both of the cabin air compressing devices 30$a$, 30$b$ such that a first portion of the compressed first medium output from the first and second cabin air compressing devices 30$a$, 30$b$ is provided to the inlet 41 of the ECS pack 40 for conditioning therein and a second portion of the compressed first medium output from the first and second cabin air compressing devices 30$a$, 30$b$ is provided to the bypass conduit 60. To address this excess flow, at least one bypass conduit 60 may be fluidly connected to a compressor outlet 39 of at least one of the cabin air compressing devices 30$a$. 30$b$. In the illustrated, non-limiting embodiment, the bypass conduit 60 is fluidly coupled to the compressor outlet 39 of both cabin air compressing devices 30$a$. 30$b$. As shown, the bypass conduit 60 has a bifurcated end including a first branch 62 fluidly connected to the cabin air compressing device 30$a$ at a location at or downstream from the compressor outlet 39 and upstream from the at least one conduit 51 connected to an inlet of the ozone converter 52 or the inlet 41 of the ECS pack 40 and a second branch fluidly connected to the cabin air compressing device 30$b$ at a location at or downstream from the compressor outlet 39 and upstream from the conduit 51 connected to an inlet of the ozone converter 52 or the inlet 41 of the ECS pack 40.

A second opposite end 66 of the bypass conduit 60 is fluidly connected to a component or system located downstream from the cabin air compressing devices 30$a$, 30$b$. For example, the second end 66 of the bypass conduit 60 may be fluidly coupled to the ECS pack 40. In the illustrated, non-limiting embodiment, the second end 66 of the bypass conduit is fluidly connected to the ram air circuit 42, such as within the interior of the ram air shell 44. Because of the warm temperature of the first flow of compressed first medium A1$a'$ and/or second flow of compressed first medium A1$b'$ provided to the bypass conduit 60, the outlet end 66 of the bypass conduit 60 may be located downstream from at least one, and in some embodiments all of the ram air heat exchangers 46, 48. Although a single bypass conduit 60 fluidly connected to the compressor outlet 39 of each of the plurality of cabin air compressing devices 30$a$, 30$b$ is illustrated and described, it should be appreciated that in other embodiments, a separate bypass conduit may be associated with and fluidly couple each compressor outlet 39 to the ECS pack 40, such as to the ram air circuit 42 for example, individually.

In an embodiment, at least one valve is operable to control the first flow of compressed first medium A1$a'$ and/or the second flow of compressed first medium A1$b'$ output from a compressor outlet 39 to the bypass conduit 60. In the illustrated, non-limiting embodiment, a valve V is arranged within the bypass conduit 60 at the interface between the first branch 62 and the second branch 64. However, embodiments including a valve arranged at the interface between a compressor outlet 39 and one of the branches 62, 64 of the bypass conduit 60, and alternatively or additionally including a valve arranged downstream from the interface between the first branch 62 and the second branch 64 are also contemplated herein. The one or more valves V may be operated or moved between a plurality of positions by a controller C, such as in response to a sensed parameter at the compressor inlet 36 or the compressor outlet 39. For example, the sensed parameter may be the pressure directly downstream from the compressor outlet 39. However, other suitable parameters are also contemplated herein. In other embodiments the valve V may be a check valve configured to open in response to a pressure acting thereon.

The first flow of compressed first medium A1$a'$ and/or the second flow of compressed first medium A1$b'$ output from the bypass circuit 60 into the interior of the ram air shell 44 of the ram air circuit 42 is mixed with the heated ram air A$_R$ output from the plurality of ram air heat exchangers 46, 48. This mixture is then exhausted or dumped overboard to the ambient atmosphere surrounding the aircraft. The flow of ram air $A_R$ is generally driven through the ram air shell 44 by a pressure drop between the ram inlet 70 and the ram outlet 72 and the amount of ram air $A_R$ provided to the ram inlet 70 may be modulated by ram doors (not shown) on the aircraft. During operation of the aircraft in a first or ground mode (i.e., when the aircraft is on the ground), a ram air fan 74 creates the pressure differential between the ram inlet 70 and the ram outlet 72 to draw ram air $A_R$ and in some embodiments the first flow of compressed first medium A1$a'$ and/or the second flow of compressed first medium A1$b'$, through the ram air shell 44. However, when the aircraft is in a second mode, such as when the aircraft is at cruise and another flight segment, the ram air fan 74 may be bypassed using a ram bypass check valve 76. Backpressure caused by the ram doors at the ram outlet 72 may limit the amount of cooling airflow that may be drawn through the ram air shell 44.

In an embodiment, the ram air fan 74 is integrally formed with the thermodynamic device 50. For example, the ram air fan 74 may be mounted to a shaft supporting the at least one compressor and the at least one turbine, such that the ram air fan is driven by energy extracted form a medium within the turbine via the shaft. In another embodiment, as illustrated in FIG. 1, the ram air fan 74 may be separate and located remotely from the thermodynamic device 50. As shown, the ram air fan 74 may be arranged near the ram outlet 72 and is operable to draw a flow therethrough.

In an embodiment, the pressure differential created by operation of the ram air fan 74 is sufficient to draw the first flow of compressed first medium A1$a'$ and/or the second flow of compressed first medium A1$b'$ through the bypass conduit 60 and into the ram air shell 44. Alternatively, or in addition, the pressure of the first flow of compressed first medium A1$a'$ and/or the second flow of compressed first medium A1$b'$ exhausted into the ram air circuit 42 via the bypass conduit 60 may be sufficient to draw the ram air $A_R$ through the ram air shell 44. In the illustrated, non-limiting embodiment of FIG. 3, the ram air fan 74 includes a casing 80 having a substantially hollow interior 82 and a fan rotor 84 including a plurality of fan blades 86 rotatably mounted within the interior 82 of the casing 80. The casing 80 may be a separate component mounted within the ram air shell 44, or alternatively, may be defined by one or more surfaces of the ram air shell 44. It should be appreciated that embodiments where the ram air fan 74 does not have a rotor positioned within the casing 80 are also contemplated herein.

In an embodiment, the ram air fan 74 may be configured as an air amplifier. In such embodiments, the outlet of the bypass conduit 60 may be positioned to direct at least a portion of the first flow of compressed first medium A1$a'$ and/or the second flow of compressed first medium A1$b'$ over an interior surface 88 of the casing 80. The interior surface 88 of the casing 80 may function as a Coanda surface, or a surface over which a fluid exhibits the Coanda effect. In such an embodiment, the first flow of compressed first medium A1$a'$ and/or the second flow of compressed first medium A1$b'$ is configured to flow over the surface 88 closely or hug the surface 88. The first flow of compressed first medium A1$a'$ and/or the second flow of compressed first medium A1$b'$ may be considered a primary flow provided to the ram air fan 74. As the flow A1$a'$ and/or A1$b'$ is output from a nozzle or orifice onto the Coanda surface 88, the primary flow A1$a'$ and/or A1$b'$ entrains the surrounding ram air $A_R$, considered to be a secondary flow, thereby forming an amplifier that supplies a mixture of the primary flow and the secondary flow entrained therein at the outlet of the ram air fan 74. As the secondary flow is drawn into the primary flow, a low pressure region is created, causing displacement of the secondary air or ram air $A_R$ from other regions around the ram air fan and from an upstream region within the ram air shell.

By operating the ram air fan 74 as an air amplifier driven by at least one of the first flow of compressed first medium A1$a'$ and/or the second flow of compressed first medium A1$b'$, the overall power required to operate the ram air fan 74 to move ram air $A_R$ through the ram air circuit 42 may be reduced. Further, in some embodiments, the first flow of compressed first medium A1$a'$ and/or the second flow of compressed first medium A1$b'$ may be used to move ram air $A_R$ through the ram air circuit 42 even when the ram air fan 74 is non-operational. In such embodiments, the ram air fan 74 may be configured as a generator and rotation of the rotor 84 driven by the first flow of compressed first medium A1$a'$ and/or the second flow of compressed first medium A1$b'$ is used to create electricity.

An environmental control system 20 as illustrated and described herein provides efficient surge control without adding complexity to the control of the system. In addition, the power consumed by the ram air fan 74 may be reduced or the flow through the ram air circuit 42 may be increased.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An environmental control system for a vehicle comprising:

at least one cabin air compressing device including a compressor having a compressor inlet and a compressor outlet;

an environmental control system pack located downstream from and fluidly coupled to the compressor outlet via at least one conduit, the environmental control system pack including a ram air circuit; and a bypass conduit fluidly coupling the compressor outlet to the ram air circuit.

2. The environmental control system of claim 1, wherein the ram air circuit further comprises a ram air shell, the bypass conduit being fluidly coupled to an interior of the ram air shell.

3. The environmental control system of claim 2, wherein the ram air circuit further comprises at least one ram air heat exchanger arranged within the ram air shell, the bypass conduit being fluidly coupled to the interior of the ram air shell at a location downstream from the at least one ram air heat exchanger.

4. The environmental control system of claim 3, wherein the at least one ram air heat exchanger further comprises a plurality of ram air heat exchangers, the bypass conduit being fluidly coupled to the interior of the ram air shell downstream from the plurality of ram air heat exchangers.

5. The environmental control system of claim 1, wherein the bypass conduit is fluidly connected to the compressor outlet at a location upstream from the at least one conduit.

6. The environmental control system of claim 1, wherein the cabin air compressing device further comprises:

a shaft connected to the compressor; and an electric motor operably connected to the shaft and configured to drive the compressor.

7. The environmental control system of claim 1, wherein the at least one cabin air compressing device further comprises a first cabin air compressing device and a second cabin air compressing device arranged in parallel.

8. The environmental control system of claim 7, wherein the bypass conduit is fluidly coupled to the compressor outlet of both the first cabin air compressing device and the second cabin air compressing device.

9. The environmental control system of claim 1, further comprising a valve associated with the bypass conduit, the valve being operable to control a supply of a compressed first medium provided to the ram air circuit.

10. The environmental control system of claim 9, further comprising a controller operable to move the valve between a plurality of positions to control the supply of the compressed first medium provided to the ram air circuit.

11. The environmental control system of claim 9, wherein the compressed first medium includes ram air.

12. The environmental control system of claim 9, wherein the compressed first medium includes bleed air.

13. The environmental control system of claim 1, wherein the vehicle is an aircraft.

14. A method of operating an environmental control system of a vehicle, the method comprising:

providing a medium to a compressor inlet of a compressor of at least one cabin air compressing device via a conduit;

compressing the medium at the compressor to produce a compressed medium;

providing a first portion of the compressed medium from a compressor outlet to an environmental control system pack; and exhausting a second portion of the compressed medium provided at the compressor outlet to a ram air circuit of the environmental control system pack.

15. The method of claim 14, wherein exhausting the second portion of the compressed medium provided at the compressor outlet to the ram air circuit further comprises operating a valve associated with a bypass conduit, the bypass conduit fluidly connecting the compressor outlet and the ram air circuit.

16. The method of claim 15, wherein the second portion of the compressed medium exceeds a required flow rate of the at least one cabin air compressing device.

17. The method of claim 15, wherein the ram air circuit further comprises a ram air shell having at least one ram air heat exchanger arranged therein and exhausting the second portion of the compressed medium provided at the compressor outlet to the ram air circuit further comprises providing the second portion of the compressed medium to the ram air shell downstream from the at least one ram air heat exchanger.

18. The method of claim 17, wherein the at least one ram air heat exchanger further comprises a plurality of ram air heat exchangers, and the second portion of the compressed medium is exhausted into the ram air shell downstream from the plurality of ram air heat exchangers.

19. The method of claim 14, wherein the vehicle is an aircraft.

* * * * *